Figure 1:
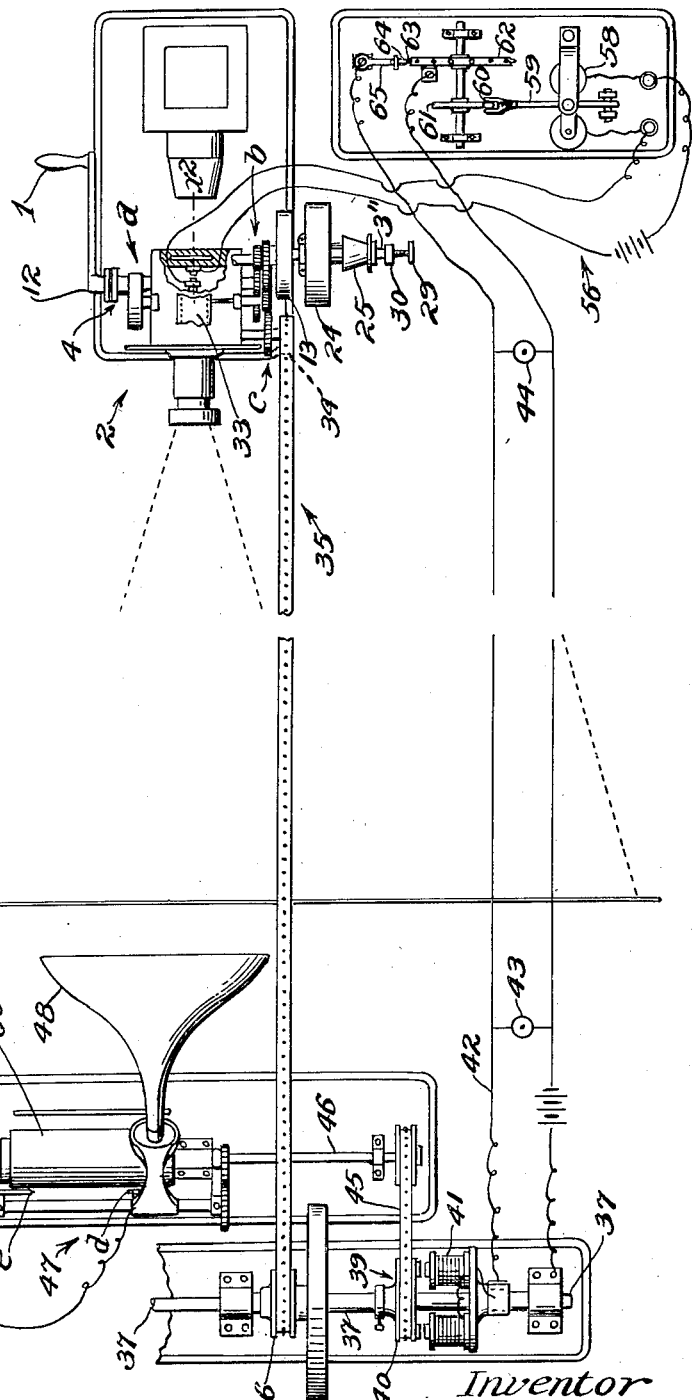

E. H. AMET.
COMBINATION APPARATUS FOR SYNCHRONIZING MOTION AND SOUND REPRODUCTIONS.
APPLICATION FILED SEPT. 5, 1911.

1,065,576.

Patented June 24, 1913.

3 SHEETS—SHEET 1.

Witnesses:
M. Beulah Townsend
L. Belle Rice
C. C. Holly

Inventor
Edward H. Amet
James R. Townsend
his atty.

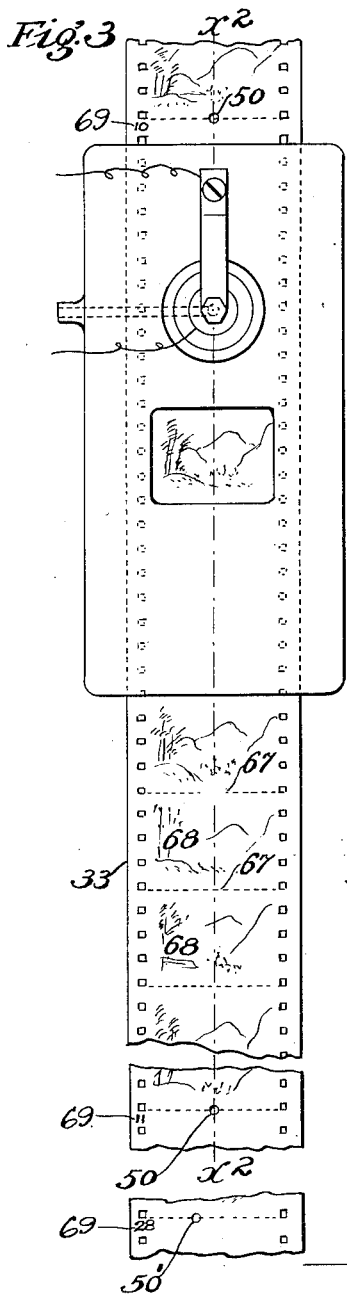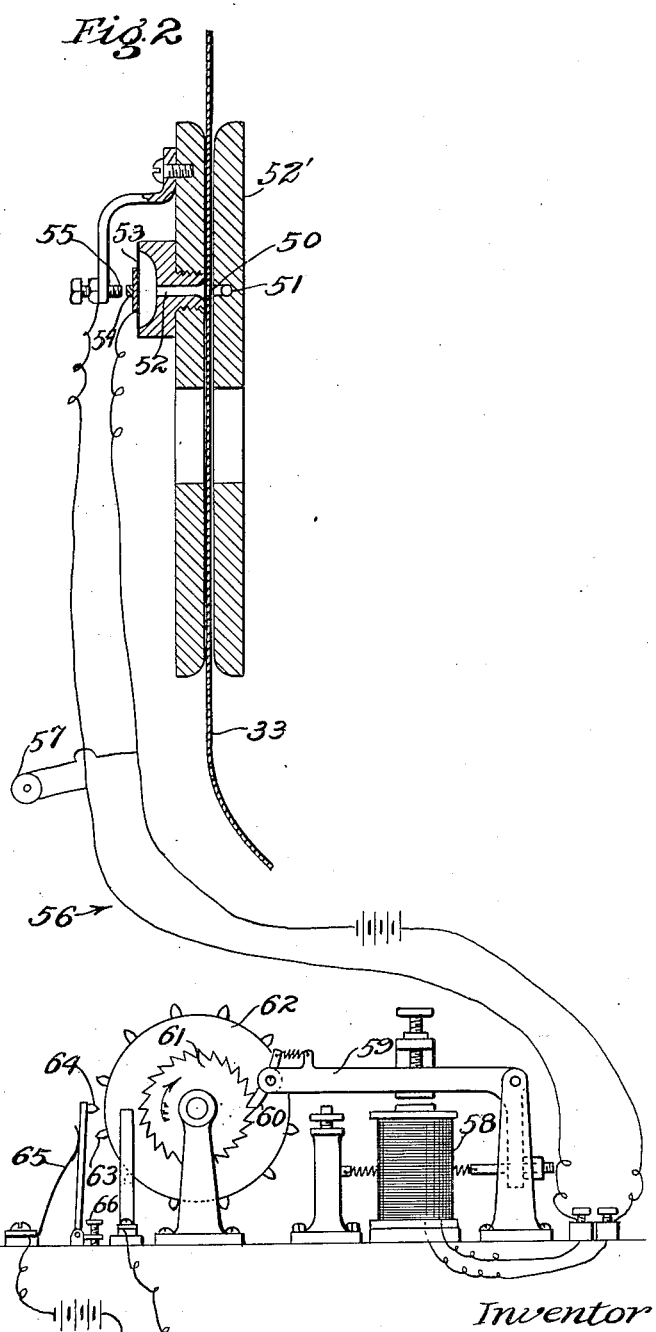

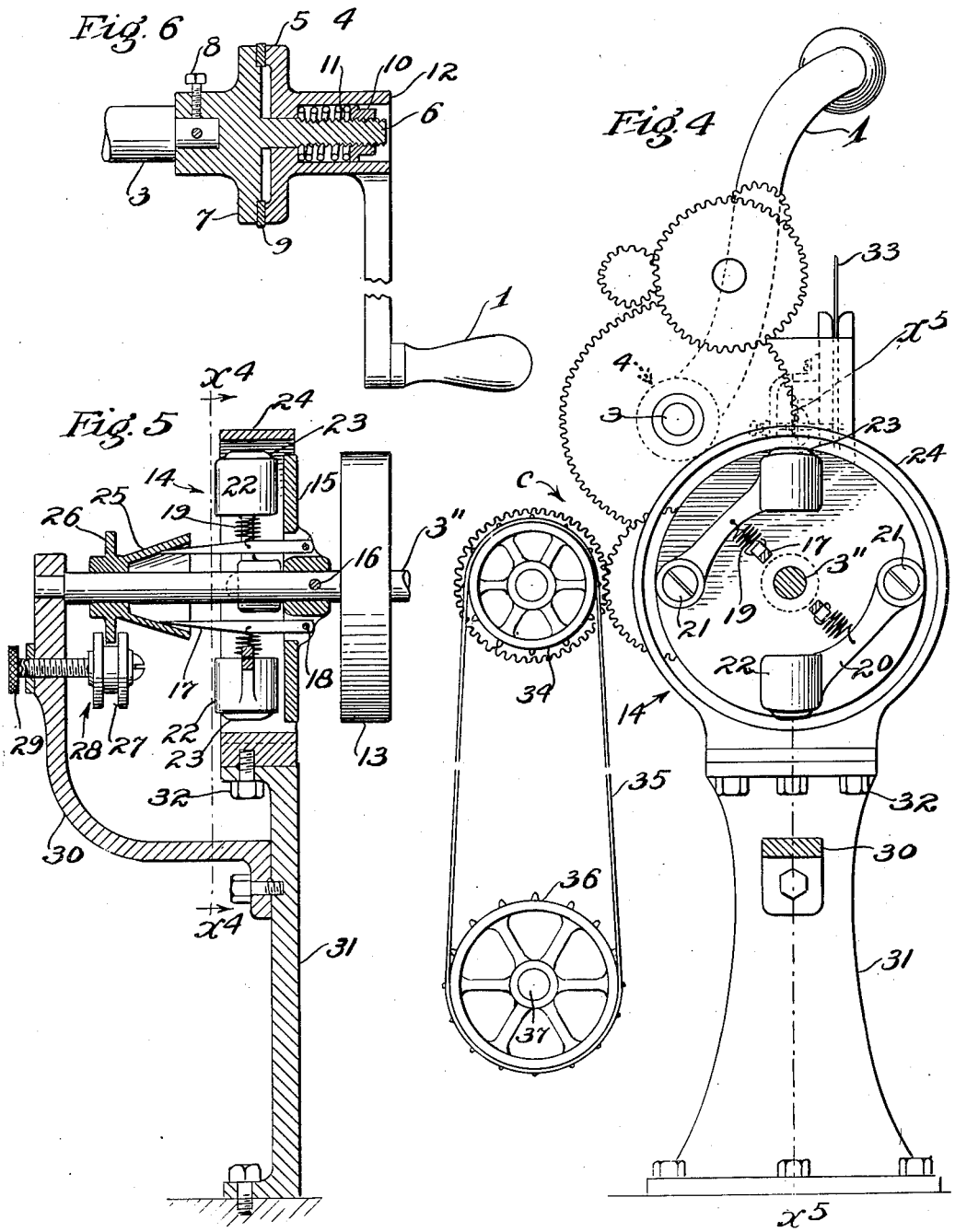

ously thrown into and successively thrown

UNITED STATES PATENT OFFICE.

EDWARD H. AMET, OF REDONDO BEACH, CALIFORNIA.

COMBINATION APPARATUS FOR SYNCHRONIZING MOTION AND SOUND REPRODUCTIONS.

1,065,576.  Specification of Letters Patent.  Patented June 24, 1913.

Application filed September 5, 1911. Serial No. 647,769.

*To all whom it may concern:*

Be it known that I, EDWARD H. AMET, a citizen of the United States, residing at Redondo Beach, in the county of Los Angeles and State of California, have invented a new and useful Combination Apparatus for Synchronizing Motion and Sound Reproductions, of which the following is a specification.

An object of the invention is to provide means whereby motion pictures may be reproduced with such verbal portions and sound effects as would or should naturally emanate from or accompany the acts of the characters or objects photographed in the motion picture such as conversation, music, birds singing, bells ringing, whistling, etc.

An object is to maintain synchronism between motion and sound reproductions by simple mechanical means.

Another object is to provide in synchronism, the necessary records of the sound and motion acts; to reproduce the same in synchronism with minimum destructive or wearing action upon the picture film; and to provide for accurately starting the motion and sound reproducing devices together.

It is necessary in order to maintain the synchronism that provision be made whereby allowance for breakage of the film may be accurately made so that in case a portion of the film is broken or cut out the film can still be adjusted synchronously relative to the sound record.

The invention comprises the combination with a motion picture machine and a sound record machine of means for connecting the same so that when one of said machines is operated at its proper speed the other of said machines will be operated at its proper speed.

The invention also includes means for starting the sound record machine at the proper instant relative to the film subject of the picture machine.

The connecting means may be electrical or mechanical. For instance, the two machines may be connected to a constant speed electric motor having driving pulleys in proper proportion to give the required speeds to the two machines; or the machines may be widely separated where the required current is obtainable, and driven by induction motors having pulleys in the proper proportion to drive the two machines at proper speeds; but I prefer mechanical means as the crank drive operated by hand is the adopted drive for motion picture machines.

It is not necessary to illustrate all the forms in which the invention may be carried out and I shall illustrate only the form I at present consider the most practical, and in which the machines are geared together and the sound record machine is made to depend upon the picture machine for its proper speed.

In this specification the term sound record machine includes both the sound recording and the sound reproducing apparatus, and the term motion picture machine, includes both the camera and the projection machine.

In carrying out this invention it is desirable that the sounds be reproduced near the points from which they appear to emanate and in some instances this may be accomplished by extending a connection from the motion picture machine to a station below; behind at one side of or elsewhere near to the screen upon which the picture is to be projected; and in other instances the sound reproducing machine may be at the same station with the motion picture projecting machine, and the transmission and reproduction of the sounds at the appropriate locations be effected by electrical means. In such electrical transmission the sound reproducing machine may be provided with a carbon telephone transmitter instead of the usual amplifying horn, and may be connected in a circuit having a telephone receiver at the appropriate station. It is not necessary in this application to illustrate such an arrangement as the same is exemplified in my companion application, Serial No. 636,740, filed July 3, 1911.

It is obvious that a combined motion and sound reproduction of any considerable length may require the use of a considerable number of sound record devices as phonograph record cylinders or Victor record disks and I shall therefore illustrate the apparatus as applied for operating an indefinite number of sound reproducing machines that may be successively thrown into and out of operation all being driven from one synchronizing mechanism operated by connection with the motion picture machine.

The invention may be understood by reference to the accompanying drawings.

Figure 1 is a broken plan, partly diagrammatic, of apparatus constructed in accordance with and for the purpose of carrying out this invention as applied with the motion picture machine on one side and the sound machine on the other side of the picture screen. Fig. 2 is a fragmental elevation partly in section on line $x^2$, Figs. 1 and 3, to illustrate the electro-pneumatic means for starting and stopping a sound record. Fig. 3 is an elevation from the left of Fig. 2 showing a picture ribbon or film in place and broken to contract the view. Fig. 4 is an elevation of the means for controlling the speed of the motion picture projecting machine and also illustrating part of the gearing between said machine and the sound reproducing machine. Line $x^4$, Fig. 5, indicates the plane of sight, looking in the direction of the arrows. Fig. 5 is a sectional elevation from line $x^5$, Fig. 4, illustrating the centrifugal governing device. Fig. 6 is a sectional detail of the connection between the crank and the driving shaft of the motion picture machine.

The crank 1 of the motion picture machine 2, is connected with the driving shaft 3 through a regulatable slip frictional connection, which, as shown in Fig. 6 comprises a friction wheel 5 rotatably mounted on a stem 6 which extends axially from the friction hub 7, that is fixed by a set screw 8 on the driving shaft 3. Said friction wheel 5 is held in frictional engagement with the hub 7 through a shoe 9 of fiber or other suitable material by a regulating nut 10 screwed on the stem 6 against the pressure spring 11; said stem, nut and spring being contained in the hollow body 12 of the crank 1. By tightening or loosening the nut 10 the force exerted through crank 1 to turn the shaft 3 may be increased or decreased. When the resistance of the shaft 3 exceeds the regulated force the crank will slip relative to the shaft.

A fly wheel 13 is mounted on a shaft 3″ which is connected with the shaft 3 through the trains $a$, $b$, of gearing, and a centrifugal governor 14 is provided to exert a retarding effect on the shaft 3″, and consequently on shaft 3 when the required speed has been reached thus allowing the shafts 3 and 3″ to be turned to but not exceeding the regulated speed. By turning the crank 1, somewhat faster than the determined speed, the shafts 3 and 3″ will be made to run constantly at the regulated speed.

The governor 14 comprises a head 15 fixed by a pin 16 to the shaft 3″ and provided with fingers 17 that are pivoted at 18 to the head, and are connected by springs 19 with centrifugal arms 20 which are pivoted to the head by pivots 21 at one end and are provided at the other end with weights 22 which overcome the springs 19 when the speed limit is approached and act through the brake shoes 23 on the brake rim 24, thereby producing friction which will cause sufficient slippage of the friction wheel 5 to prevent the speed limit from being exceeded. The fingers 17 are movable on their pivots 18 to throw the springs 19 toward the shaft 3 and are held in opposition to the springs 19 by the conical cup 25 which rotates with the shaft 3″ and fingers 17, and is provided with a flange 26, which extends into a groove 27 of a rotatable head 28 that turns on an adjusting screw 29 which is screwed through an arm 30 that forms a bearing for one end of the shaft 3″ and is carried by the frame 31 to which the brake rim 24 is fixed by the cap screws 32.

The motion picture film 33 is driven by the usual mechanism not shown, which is driven from the crank 1 and it is thus seen that by means of the governor 14 and slip joint 4 the picture machine and its ribbon 33 can not be raced.

A train of gears $c$ connects a sprocket wheel 34 with the shaft 3″ and said sprocket wheel is connected by a sprocket connection 35, which may be a sprocket chain or a perforated belt, with a second sprocket wheel 36, that is fixed on a rotating element, as the shaft 37 which may be provided with a fly wheel 38. It is thus seen that when the motion picture machine is operated by its driving means, as the crank 1, the shaft 37 will be driven at a speed determined by the speed of the motion picture machine so long as the speed of the driving means 1, equals or exceeds the regulated speed. A collar 39 fixed to the shaft 37 holds an armature forming sprocket wheel 40 that is loosely mounted on the shaft 37 in close relation to the electro-magnet 41, which is fixed to said shaft. When the electro-magnet is energized the sprocket wheel 40 is caused to rotate with the shaft 37. The elements 40 and 41 constitute an electro-magnetic clutch. The circuit 42 of the magnet is controlled by the keys 43, 44, and an automatic control actuated from the film. The sprocket wheel 40 is connected by a suitable connection, as the perforated belt 45, with the shaft 46 of the sound record machine 47, which machine in the instance shown has a horn 48, suitably arranged relative to a screen 49 upon which the motion picture is to be projected. By the arrangement described the motion picture machine and the sound reproducing machine connected thereto may each be adjusted to the speed which will give the most perfect individual reproductions and still bear to each other such ratio of speeds that, if they are started in register they will continue in register throughout the reproduction. It is understood that any number of talking machines may be thus connected with the motor shaft 37 and electro-magnet clutches and circuits therefor may be employed, and that all the circuits may be controlled from one station. One such talking machine is shown in plan and an electrical circuit 42' closable by the contacts d, e to cut in another sound reproducing machine is shown. The connection between any talking machine and the shaft 37 will in each instance, comprise a clutch and connection like those shown, whereby the motion from the connection 35 may be applied to operate the shaft of a talking machine.

The film 33 may be provided at appropriate points with perforations 50 capable of affording communication, between a compressed air port 51 and an air duct 52 in the ribbon guide 52' that supplies air to operate a diaphragm 53 which carries a movable contact 54 that connects with the stationary contact 55 when the air pressure is on the diaphragm; thus completing an electrical circuit 56 which may be cut-in by the push button switch 57 and which energizes an electro-magnet 58 to operate a spring returned armature 59 that carries a pawl 60 to engage a ratchet wheel 61, thereby to rotate a contact wheel 62 provided with contacts 63 for connection with the yielding contact point 64 that is held by a spring 65 in the path of the contact 63, being regulated by a screw 66 so that the distance it is allowed to project into said path may be increased or decreased. The spring 65 makes a connection with one side of the circuit 42 so that when the contacts 63, 64 complete the circuit 42, the electro-magnet 41 of the clutch 39 is energized so that the sprocket wheel 40 will be driven and consequently the sound reproducing machine will be operated. It is thus seen that when one perforation 50 passes the port 51 the circuit 42 will be closed, and when the next perforation 50 passes the port 51, the circuit 42 will be opened; thus causing the talking machine to alternately operate and cease operation. The number of teeth in the ratchet wheel 61 of the step by step circuit closer equals twice that of the number of contacts for the contact wheel, so that one operation of the armature 59 will move the contact wheel to make contact between the contact 63 and one of the contacts 64; and the next movement of the armature will break such contact. The perforations 50 in the film or ribbon 33 are placed on the dividing lines 67 between the image carrying spaces 68, so that said perforations will pass between the light and the lens at the moment the shutter of the motion picture projecting machine is closed, so that no undesirable flashing will occur on the screen.

In using this instrument for the reproduction of an act including visual actions and sound accompaniments, the motion picture machine requires continuous operation covering the act and announcements between acts but the sound portions of the act are not necessarily continuous, and they are wholly absent during announcements between acts. It is therefore important that the sound record shall only run at the times when the act is or should be accompanied by sounds. Consequently, in order to economize the sound record or records, I have provided means operated by the motion picture record, ribbon or film to start and stop the sound recording or reproducing action of the sound record machine.

The speed at which the motion picture camera or projecting machine can be run either by hand or by power, is practically limited by nature and is commonly fixed by proper gearing at a predetermined number of exposures per minute, and the sound reproducing machine record also requires a certain number of revolutions per minute for practical reproduction; there being, for instance, about sixteen exposures per second for the picture machine and about 130 revolutions per minute for a phonograph record of present usual diameter. It is necessary therefore in the first place that the sound and picture records shall be produced with relation to each other so that each may have its appropriate speed, and that in the reproduction of the act said speeds shall be maintained. It is also necessary if the sound record is not to be continuously operated that its operation shall be absolutely controlled relative to that of the picture record. In other words, the feed of the motion picture film or record must bear a fixed and positive ratio to the feed of the sound record device, and the sound record device must start and stop operating its sound reproducing mechanism at times determined by the picture record. As an illustration, the two record devices may be likened to two link belts running side by side over the same gear during the periods when the sound should accompany the action of the motion picture character or subject. This relative movement between the two record devices must be initiated and terminated at exactly the right instants.

To prepare the records for reproducing an act, the following operations may be performed:

First. The sound record will be produced in proper time for the act. This may be done while the act is being rehearsed, or may be done independently of any rehearsal of the actors, whichever course may be necessary or advisable. The sound record will also be given a starting signal as three whistles or the words "one, two, three."

Second. The sound record device thus prepared will be put in the sound reproducing machine of an apparatus of this kind provided with a camera. The act will then be staged for performance and the motion picture machine, viz., the camera, will be started.

Third. When all is ready for the sound producing action, the operator will press the push button switch 43 thus energizing the electro-magnet and causing the record driving shaft 46 to rotate, thus operating the sound record device 69 until the starting signal is sounded, thereby; and thereupon the act will be performed; the actors being guided in time by the reproduced sounds; fitting the appropriate actions thereto while the camera is taking the pictures. The attendant will operate the push button to open the circuit at the times when the acts are silent and to close the circuit when sounds are again required and the performance continues until the picture has been taken in time with the sound record.

Fourth. The picture film or ribbon will then be developed and the perforations 50 will be made on the dividing lines between the spaces 68 on which those pictures occur at which the sound record was started or stopped so that when the film is run through the projection machine of this apparatus, the automatic action to start and stop the sound record will be caused as hereinbefore explained.

In order to cause the same picture record ribbon to start and stop the various sound effects at appropriate times, other holes out of line with the holes 50, as indicated at 50', Fig. 3, may be made in the ribbon, and one or more other electro-pneumatic diaphragms with appropriate air ducts controlled by their respective line of holes may be applied within reasonable limits to operate step by step, through a circuit closer, the several sound record machines.

In order that the synchronism of the sound and motion record devices may be maintained or restored in spite of breakage of the picture ribbon or destruction of portions thereof, the ribbons will be supplied at intervals with consecutive designating characters as the numbers 69 so that if one or more sections of the ribbon become injured or destroyed, duplicates of such sections may be ordered and appropriately inserted in the ribbon from which the damaged sections are removed.

It is understood that various effect-producing means operated from the picture record device, as the ribbon of the picture machine, may be employed in connection with the picture machine, as for instance, mechanical devices for producing sound effects, as thunder, clatter of horses' hoofs, drum-beating, etc., and I regard this invention as being applicable through a wide range of equivalents.

It is understood that the purpose of using the electro-pneumatic arrangement is to readily operate the starting and stopping means without injury to the film, and that the holes, that is to say the margins of such holes, may be made to operate mechanically, various mechanical arrangements by which said starting and stopping may be effected. Such mechanical arrangements are recognized as equivalents of the electro-pneumatic means shown, and their illustration is not herein attempted.

The air discharging from the air duct on the film will have a tendency to keep the film free from dust.

I claim:—

1. The combination with a motion picture machine provided with a ribbon, of pneumatic means to apply pneumatic pressure to one side of the ribbon; said ribbon being provided with perforations; a diaphragm arranged to be operated by pressure passing through such perforations; an electric circuit opened and closed by operation of said diaphragm; an electro-magnet in said circuit; an armature actuated by said electro-magnet; a sound reproducing machine; mechanism driven by the motion picture machine to operate the sound reproducing machine; and means controlled through said armature for operatively connecting and disconnecting the sound reproducing machine with said mechanism.

2. A motion picture machine comprising a ribbon and means for operating said ribbon; said ribbon being provided with picture spaces and with perforations on the lines between said picture spaces; means to supply pneumatic pressure on said picture ribbon, a sound reproducing machine and electro-pneumatic means actuated through said perforations to control the operation of the sound reproducing machine.

3. The combination with a motion picture machine and a sound reproducing machine, of mechanism for transmitting motion from the picture machine to the sound reproducing machine; an electro-magnet for controlling said mechanism; an electro-magnet controlled by the movement of the ribbon of the motion picture machine; and step by step mechanism operated by the last named electro-magnet for energizing and deënergizing the first named electro-magnet.

4. The combination with a motion picture machine and a sound reproducing machine of an electro-magnet; mechanism operated by the motion picture machine for operating the record device of the sound reproducing machine; means controlled by said electro-magnet to control the operation of the sound reproducing machine through said mechanism; a step by step circuit closer to control said electro-magnet and an electro-magnet controlled by the film of the motion picture machine to operate the step by step circuit closer.

5. In an apparatus of the class set forth a step by step circuit closer comprising a ratchet wheel and a contact wheel; said ratchet wheel having twice as many teeth as the contact wheel; a motion picture machine provided with a ribbon; an electrical circuit having contacts which are connected and disconnected by the operation of the picture machine ribbon; an armature to operate the ratchet wheel; a magnet in said circuit to operate the armature; a sound reproducing machine; mechanism for operating the sound reproducing machine in synchronism with the motion picture machine; means to operatively connect and disconnect said mechanism and the sound reproducing machine, and an electrical circuit opened and closed by said step by step circuit closer to control said connecting and disconnecting means.

6. The combination in a motion picture and sound reproducing means, of a motion picture ribbon having therein perforations spaced therealong, means to apply fluid pressure to one side of the ribbon, and electro-pneumatic sound reproducing machine controlling means on the other side of the ribbon to be operated by fluid pressure through the perforations.

7. In a motion picture and sound reproducing apparatus, the combination with a motion picture ribbon having holes, of means for supplying air pressure, a sound producing machine and electro-pneumatic means operated by the passage of air under pressure through said holes, for the purpose of starting and stopping the sound-producing machine in synchronism with said motion picture ribbon.

8. The combination with a motion picture ribbon having perforations therethrough; of a guide having an aperture of proper dimension and arranged to communicate with said perforations as the ribbon is operated; means to supply to the ribbon air under pressure forced through said aperture; an electro-pneumatic device in opposition to said aperture to be operated by the air at such moment as the perforation in the motion picture ribbon coincides or registers with said aperture; a sound-producing machine used to produce the sounds which accompany the movements of the motion picture characters or objects as specified, and mechanism controlled by said electro-pneumatic device for starting or stopping the sound-producing machine at proper times.

9. The combination with a motion picture ribbon feeding device having a centrifugal speed controlling governor and a friction driving crank adjustable to drive the said motion picture ribbon feeding device without overpowering the controlling effect of the centrifugal governor; of a sound-producing machine and electro-pneumatic means for starting and stopping said sound-producing machine, said electro-pneumatic means operated by holes made in the proper places through the moving picture ribbon fed by the said motion picture ribbon feeding device as specified.

In testimony whereof, I have hereunto set my hand at Los Angeles, California, this 30th day of August, 1911.

EDWARD H. AMET.

In presence of—
   JAMES R. TOWNSEND,
   L. BELLE RICE.